(12) United States Patent
Kume (10) Patent No.: US 10,659,937 B2
(45) Date of Patent: May 19, 2020

(54) AGENT CONTROLLER AND AGENT COORDINATION METHOD

(71) Applicant: Toyota Jidosha Kabushiki Kaisha, Toyota-shi, Aichi-ken (JP)

(72) Inventor: Satoshi Kume, Chofu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/257,945

(22) Filed: Jan. 25, 2019

(65) Prior Publication Data

US 2019/0239041 A1 Aug. 1, 2019

(30) Foreign Application Priority Data

Jan. 29, 2018 (JP) .................................. 2018-012247

(51) Int. Cl.
*G08G 1/09* (2006.01)
*H04W 4/46* (2018.01)
*G06K 9/00* (2006.01)
*B60W 40/09* (2012.01)
*G08G 1/00* (2006.01)

(52) U.S. Cl.
CPC .............. *H04W 4/46* (2018.02); *B60W 40/09* (2013.01); *G06K 9/00825* (2013.01); *G08G 1/00* (2013.01)

(58) Field of Classification Search
CPC .... H04W 4/46; G06K 9/00825; B60W 40/09; G05D 1/0246; G05D 1/0287
See application file for complete search history.

(56) References Cited

U.S. PATENT DOCUMENTS

| 9,747,800 | B2* | 8/2017 | Suzuki | G08G 1/163 |
| 2012/0140984 | A1* | 6/2012 | Miyajima | G06K 9/00993 |
| | | | | 382/103 |
| 2014/0292545 | A1* | 10/2014 | Nemoto | G08G 1/163 |
| | | | | 340/988 |
| 2015/0294471 | A1 | 10/2015 | Jang et al. | |
| 2017/0147893 | A1 | 5/2017 | Wilbert et al. | |
| 2018/0225963 | A1* | 8/2018 | Kobayashi | G08G 1/00 |

FOREIGN PATENT DOCUMENTS

JP 2007-232610 A 9/2007

\* cited by examiner

*Primary Examiner* — Toan N Pham
(74) *Attorney, Agent, or Firm* — Dinsmore & Shohl LLP (57) ABSTRACT

An agent controller controls an agent that provides driving assistance information to a driver who drives a first vehicle. The agent controller includes a storage unit and a processor. The storage unit is configured to store vehicle recognition information of a second vehicle located around the first vehicle. The processor is configured to acquire an image around the first vehicle, captured by a camera. The processor is configured to identity a vehicle included in the captured image as the second vehicle that matches the vehicle recognition information. The processor is configured to transmit information to the second vehicle or receive information from the second vehicle by coordinating the agent of the first vehicle with an agent of the second vehicle identified by the processor.

11 Claims, 4 Drawing Sheets

AGENT CONTROLLER AND AGENT COORDINATION METHOD

CROSS-REFERENCE TO RELATED APPLICATIONS

This application claims priority to Japanese Patent Application No. 2018-012247 filed on Jan. 29, 2018, which is incorporated herein by reference in its entirety including the specification, drawings, and abstract.

BACKGROUND

1. Technical Field

The present disclosure relates to an agent controller and agent coordination method that assist in driving with an agent installed in a vehicle.

2. Description of Related Art

Japanese Unexamined Patent Application Publication No. 2007-232610 (JP 2007-232610 A) describes an advertisement distribution system. The advertisement distribution system includes a navigation system and an agent server. The navigation system transmits, to the agent server, information about a current location of a vehicle, acquired with the use of a global positioning system (GPS), and a route to a destination. The agent server distributes, to the navigation system, advertisement information as the agent server receives information from the navigation system.

SUMMARY in a situation in which a plurality of other vehicles is present around a host vehicle, when a processor of the host vehicle identifies any one of the other vehicles, even when location information of the other vehicles, acquired with the use of the GPS, is acquired, it may be difficult to identify the vehicle depending on the accuracy of the location information.

The present disclosure provides a technique for identifying a second vehicle (other vehicles) located around a first vehicle (host vehicle) in order to coordinate agents with each other.

An aspect of the disclosure relates to an agent controller. The agent controller controls an agent that provides driving assistance information to a driver who drives a first vehicle. The agent controller includes a storage unit and a processor. The storage unit is configured to store vehicle recognition information of a second vehicle located around the first vehicle. The processor is configured to acquire an image around, the first vehicle, captured by a camera. The processor is configured to identify a vehicle included in the captured image as the second vehicle that matches the vehicle recognition information. The processor is configured to transmit information to the second vehicle or receive information from the second vehicle by coordinating the agent of the first vehicle with an agent of the second vehicle identified by the processor.

According to this aspect, it is possible to easily identify the second vehicle based on the vehicle recognition information of the second vehicle and the captured mage around the first vehicle and start coordinating the agent of the first vehicle with agent of the second vehicle identified by the processor.

The vehicle recognition information of the second vehicle may include a predetermined blinking pattern having a set blinking action of a lamp of the second vehicle. The processor may be configured to identify a vehicle that blinks a lamp of the vehicle in the predetermined blinking pattern as the second vehicle that matches the vehicle recognition information. An on duration during when the lamp of the vehicle blinks, set in the predetermined blinking pattern may be shorter than an on duration during when the lamp of the vehicle blinks, set in a blinking pattern of hazard flashers.

The agent controller may further include a communication unit. The communication unit is configured to acquire a vehicle ID from each of a plurality of the second vehicles, and transmit, to each of the plurality of second vehicles, a blinking pattern that varies among die vehicle IDs. Thus, the first vehicle is able to determine the blinking pattern of the second vehicle, so it is possible to identify a plurality of vehicles at the same time by causing the plurality of vehicles to blink the lamps in different patterns.

The agent controller may further include a communication unconfigured to acquire an agent ID of the agent of the second vehicle and the vehicle recognition information of the second vehicle from a server device that holds the agent ID and the vehicle recognition information in association with a vehicle ID of the second vehicle. The communication unit may be configured to, when the agent of the first vehicle is executed, associate a vehicle ID of the first vehicle with an agent ID and transmit the vehicle ID and the agent ID to the server device. The communication unit may be configured to acquire an agent ID from a mobile terminal of the driver.

Another aspect of the disclosure relates to an agent coordination method. The agent, coordination method is a method of identifying a second vehicle and coordinating a first agent installed in a first vehicle with a second agent installed in the second vehicle. The agent coordination method includes: storing vehicle recognition information of the second vehicle located around the first vehicle; acquiring an image around the first vehicle, captured by a camera; identifying a vehicle included in the image captured by the camera is the second vehicle that matches the vehicle recognition information; and transmitting information to the second vehicle or receiving information from the second vehicle by coordinating the first agent with the second agent of the identified second vehicle.

According to this aspect, it is possible to easily identify the second vehicle based on the vehicle recognition information of the second vehicle and the captured image around the first vehicle and start coordinating the first agent with the second agent of the identified second vehicle.

According to the aspects of the disclosure, it is possible to provide a technique for identifying a second vehicle located around a first vehicle in order to coordinate agents with each other.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
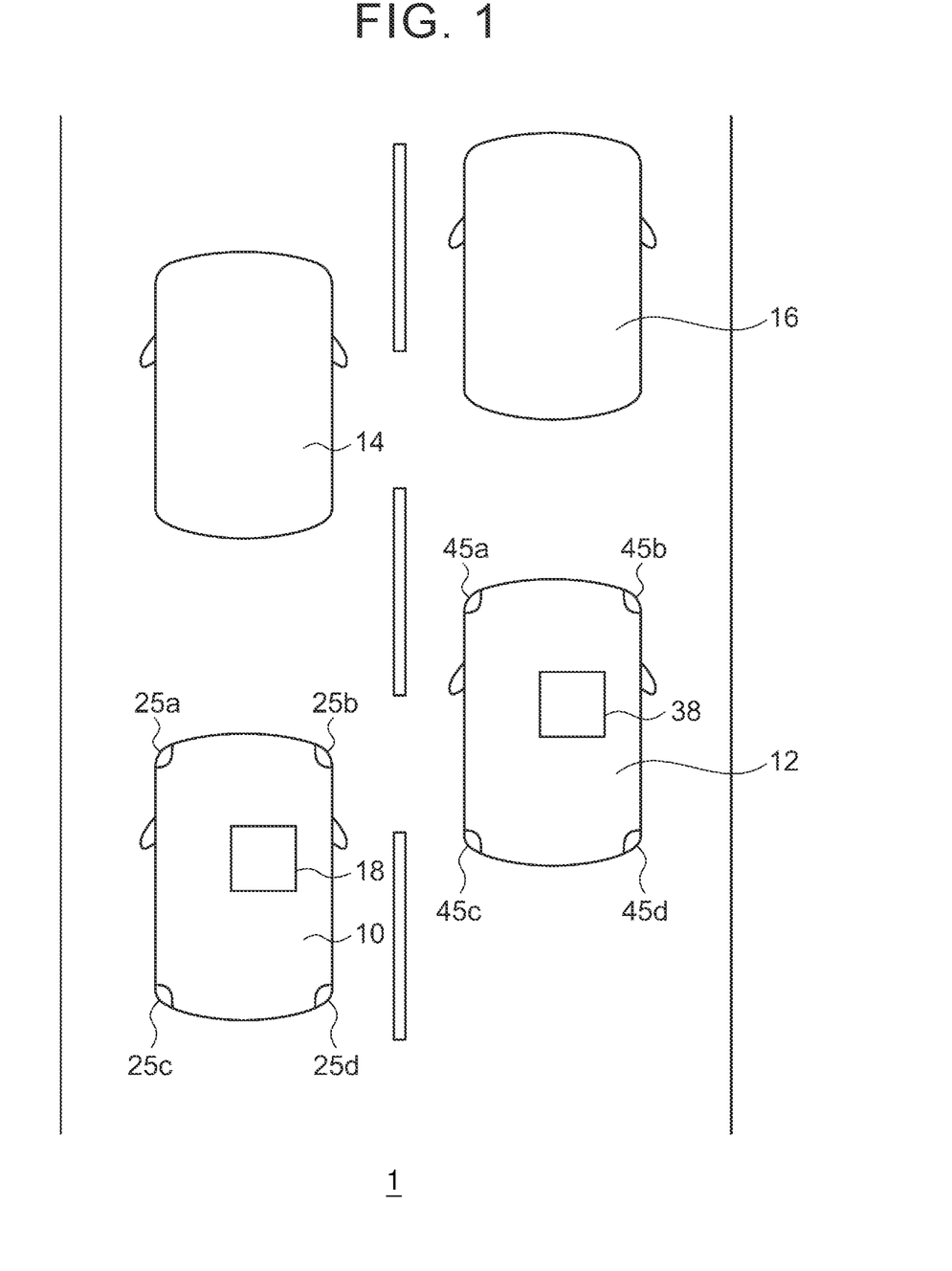
FIG. 1 is a view for illustrating an agent coordination system.

FIG. 1 is a view for illustrating an agent coordination system 1. In the agent coordination system 1, an agent of a first controller 18 mounted on a first vehicle 10 and an agent of a second controller 38 mounted on a second vehicle 12 coordinate with each other to exchange information about driving of the corresponding vehicle.

Each of the agents of the first controller 18 and second controller 38 exchanges information with a driver mainly by interaction, and assists the driver in driving by providing information related to running by way of voice and/or image.

The first vehicle 10 includes a front left lamp 25a, a front right lamp 255, a rear left lamp 25c, and a rear right lamp 25d (referred to as lamps 25 when not distinguished from one another). The front left lamp 25a, the front right lamp 25b the rear left lamp 25c, and the rear right lamp 25d are respectively provided at the four corners of the vehicle. The second vehicle 12 includes a second camera, a front left lamp 45a, a front right lamp 45b, a rear left lamp 45c, and a rear right lamp 45d (referred to as lamps 45 when not distinguished from one another). The second camera captures an image around the host vehicle. The front left lamp 45a, the front right lamp 45b, the rear left lamp 45c, and the rear right lamp 45d are respectively provided at the four corners of the vehicle.

Each of the lamps 25 may be a combination of some of a head lamp, a tail lamp, a stop lamp, a front turn signal, a rear turn signal, and the like. The lamps 25 may be formed of six lamps 25 including side marker lamps respectively provided on the sides of the vehicle. Each lamp 25 may be a newly provided lamp other than the existing turn signals, and the like. Each lamp 25 may be, for example, a lamp that uses infrared rays that are not visible light as a light source or may be a lamp that uses a light-emitting diode as a light source. The lamps 45 are similar in configuration to the lamps 25. The four lamps 25 are able to blink at the same time.

The agent of the first controller 18 is able to provide useful driving assistance information to the first driver who drives the first vehicle 10 by acquiring the running schedule and driving tendency of the second driver who drives the second vehicle 12 from the agent of the second controller 38. The agent of the second controller 38 is able to provide useful driving assistance information to the second driver by acquiring the running schedule and driving tendency of the first driver from the agent of the first controller 18. Thus, the driver who has received driving assistance information is able to smoothly perform lane change or passing.

In the situation shown in FIG. 1, as the first driver speaks of the intention to switch to the right lane, the agent of the first controller 18 needs to identify the second vehicle 12 from among vehicles located around the first vehicle 10 in order to coordinate with the agent of the second vehicle 12 traveling on the right lane. As the first controller 18 transmits a signal toward surroundings by vehicle-to-vehicle communication, each of the second vehicle 12, third vehicle 14, and fourth vehicle 16 present around the first vehicle 10 possibly receives the signal and responds to the signal. Each response signal includes an individual vehicle ID or agent ID; however, the first controller 18 is not able to identify the vehicle only with the vehicle ID or agent ID.

The first controller 18 acquires vehicle recognition information of vehicles located around the first vehicle 10 in addition to vehicle IDs or agent IDs, and identifies the vehicle based on whether the vehicle included in a captured image around the first vehicle 10 matches the vehicle recognition information. Thus, the agent of the first controller 18 is able to recognize the vehicle ID or agent ID of the identified vehicle and carry out communication with the identified vehicle, and is able to start coordination with the agent of the identified vehicle.

Alternatively, a server device may manage the location information of each vehicle and information about the agent of each vehicle, inform the agent of the first controller 18 that the agent that is being executed on the second vehicle 12 is present near the first vehicle 10, and provide the agent ID of the agent that is being executed on the second controller 38 to the first controller 18. The agent of the first controller 18 acquires, from the second controller 38 or the server device, vehicle recognition information associated with the agent ID in order to identify the vehicle on which the agent of the agent ID received from the server device is being executed, and identifies the vehicle that matches the vehicle recognition information based on a captured image.

Figure 2:
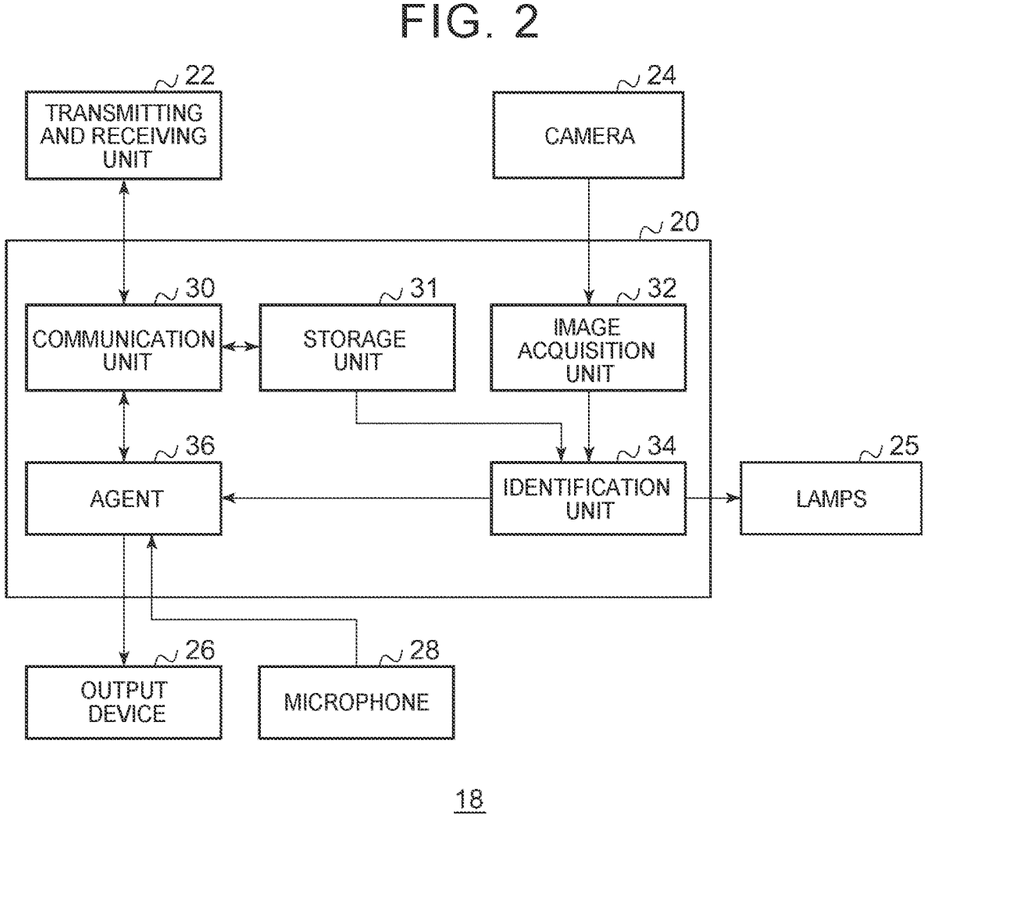
FIG. 2 is a block diagram for illustrating the functional configuration of controller provided in a first vehicle.

FIG. 2 is a block diagram for illustrating the functional configuration of the first controller 18. In FIG. 2, each of elements that are described as functional blocks that execute various processes may be thrilled of a circuit block, a memory, and another LSI, as hardware, and may be implemented by, for example, a program loaded onto the memory, as software. Therefore, persons skilled in the art understand that these functional blocks may be implemented in various forms only by hardware, only by software, or by a combination of both, and these functional blocks are not limited to forms implemented by any one of hardware and software. The second controller 38 of the second vehicle 12 is similar in functional configuration to the first controller 18.

The first controller 18 includes a control unit 20, a transmitting and receiving unit 22, a camera 24, the lamps 25, an output device 26, and a microphone 28. The control unit 20 includes a communication unit 30, a storage unit 31, an image acquisition unit 32, an identification unit 34, and an agent 36.

The transmitting and receiving unit 22 is a module that transmits or receives information by vehicle-to-vehicle communication carried out with infrared laser or radio waves and/or by communication via a relay device, such as the server device. Information that is transmitted by the transmitting and receiving unit 22 includes a vehicle ID and/or an agent ID. The transmitting and receiving unit 22 carries out communication with a drivers mobile terminal, and receives the agent ID from the driver's mobile terminal.

The camera 24 periodically captures an image around the host vehicle, and transmits the captured image to the control unit 20. The camera 24 is able to capture images all around from the host vehicle. The camera 24 may be any one of a stereo camera, a mono camera, and an infrared camera. The camera 24 may be a combination multiple types of cameras.

The output device 26 is a speaker or a display. The output device 26 outputs information to the first driver by voice or image in response to an instruction from the agent 36 of the control unit 20. The microphone 28 converts sound including a speech of the first driver into an electric signal, and transmits the signal to the agent 36 of the control unit 20.

The four lamps 25 perform a predetermined blinking pattern based on an instruction from the identification unit 34. The communication unit 30 acquires information about another vehicle via the transmitting and receiving unit 22, and transmits information about the host vehicle to the other vehicle. The storage unit 31 stores the vehicle ID and vehicle recognition information of the host vehicle, and stores the vehicle ID and vehicle recognition information of another vehicle, acquired by the communication unit 30. The storage unit 31 holds the vehicle ID in association with the agent ID of the agent 36 that is being executed on that vehicle.

The communication unit 30 transmits the vehicle ID and/or agent ID of the host vehicle and information making a request for the vehicle recognition information of another vehicle, and acquires the vehicle ID and/or agent ID of the other vehicle and the vehicle recognition information of the other vehicle. The vehicle recognition information is it based on which a vehicle is identified by appearance, and is information for identifying a vehicle from among a plurality of vehicles included in a captured image. The communication unit 30 transmits the vehicle ID and/or agent ID of the host vehicle and the vehicle recognition information of the host vehicle in response to a request for the vehicle recognition information from another vehicle. The communication unit 30 transmits the vehicle ID and/or agent ID of the host vehicle and the vehicle recognition information, so a controller of the other vehicle is able to identify the host vehicle.

The vehicle recognition information is, for example, information including the set blinking pattern of the lamps 25, and is information including the set blinking pattern, detectable from captured images although iris difficult to recognize blinking by the naked eye. The blinking pattern is, for example, blinking five times to 30 times per second. The blinking pattern of the lamps 25 sets the timings of turning on and off the lamps 25.

The image acquisition unit 32 periodically acquires a captured image around the host vehicle. The identification unit 34 analyzes the captured images, and identities the vehicle included in the captured images as another vehicle that matches the vehicle recognition information of the other vehicle, stored in the storage unit 31. Thus, it is possible to associate the vehicle ID or agent ID with the vehicle included in the captured images, so the agent 36 is able to recognize the location and vehicle ID or agent ID of the identified other vehicle and start agent coordination to transmit or receive information related to driving. For example, even when the communication unit 30 acquires location information from another vehicle by GPS, the location information possibly includes an error of approximately several meters from the actual location of the other vehicle. However, the identification unit 34 identifies another vehicle with captured images, so it is possible to accurately recognize the location of the other vehicle.

The identification unit 34 detects turn-on, and turn-off of the lamps of a vehicle from a plurality of successive captured images. When the detected turn-on and turn-off of the lamps apply to the blinking pattern set as the vehicle recognition information by a predetermined percentage or higher, the identification unit 34 identifies the vehicle as a vehicle that is identified based on the vehicle recognition information. By blinking the lamps at the four corners of a vehicle, it is possible to detect blinking of the lamps from a location at which it is not possible to capture a license number plate. Since the identification unit 34 detects blinking of the lamps from captured images, it is possible to reduce the performance of the camera 24 and the load of an analyzing process as compared to when a sign on a license number plate is recognized.

Figure 3:
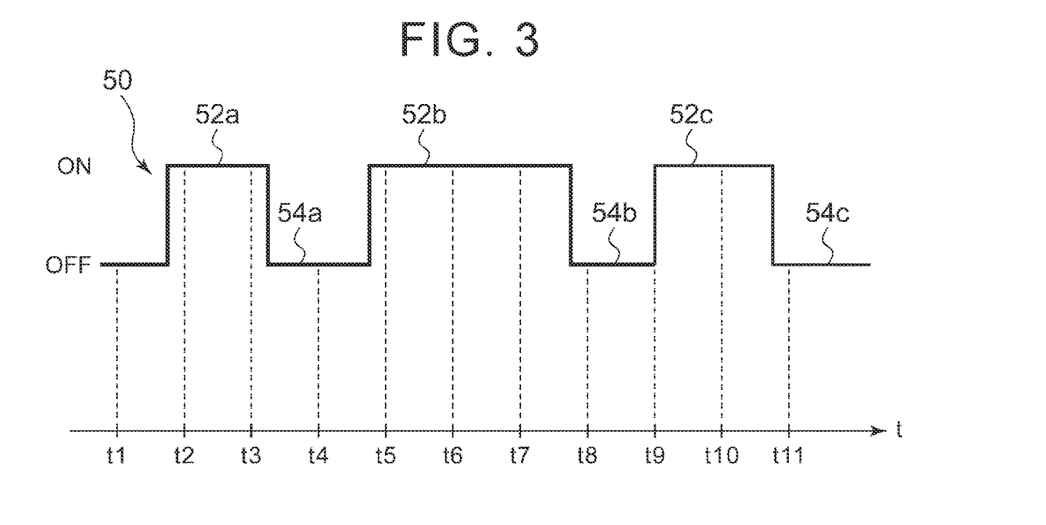
FIG. 3 is a timing chart for illustrating a process of detecting a lamp blinking pattern by an identification unit.

FIG. 3 is a timing chart for illustrating a process of detecting blinking of the lamps by the identification unit 34. A blinking pattern 50 set as vehicle recognition information shown in FIG. 3 includes set timings of turning on and off the lamps. The blinking pattern 50 includes set individual on durations 52a, 52b, 52c and set individual off durations 54a, 54b, 54c alternately. The blinking pattern 50 includes, for example, set timings of turning on and off multiple times within a second.

The camera 24, for example, captures an image 30 times per second, periodically captures an image from time t1 to time t11, and captures images when the lamps are on and images when the lamps are off. The individual on durations 52a, 52b, 52c set in the blinking pattern 50 are different from one another. The on duration 52b is set so as to be longer than the other on durations 52a, 52c. The individual off durations 54a, 54b, 54c may also be set so as to be different from one another.

The blinking pattern 50 is set such that each of the individual on durations 52a, 52b, 52c and off durations 54a, 54b, 54c is at least twice as long as the capturing interval of the camera 24. Thus, the camera 24 is able to capture an image of each turn-on and each turn-off, set in the blinking pattern 50, at least once.

The individual on durations 52a, 52b, 52c set in the blinking pattern 50 each are set to a duration shorter than the individual on duration of hazard flashers that periodically blink at timings of once to twice per second, and more desirably a duration shorter than or equal to half of the individual on duration of hazard flashers. Thus, the driver of another vehicle is difficult to confuse the blinking pattern 50 with the blinking pattern of hazard flashers. The hazard flashers may be the ones for blinking the lamps 25; however, the blinking pattern of hazard flashers differs from the blinking pattern 50 of the vehicle identification process.

The blinking pattern 50 may be set such that an average off duration is longer than an average on duration and a total off duration is longer than a total on duration. Thus, it is possible to make it difficult for the driver s f another vehicle to recognize turn-on of the lamps by shortening the on durations. The blinking pattern of the lamps, set in vehicle recognition information, may be adjusted before being transmitted to another vehicle based on whether the head lamps are on. When the head lamps are on, the on durations may be made shorter than the on durations when the head lamps are off. This is because an afterimage continues for a longer duration in the nighttime.

The identification unit 34 detects that the lamps are on at time t2, time t3, time t5, time t6, time t7, and time t10, detects that the lamps are off at time t1, time t4, time t8, and time t9, and compares the detected results with the blinking pattern 50. When the degree of matching between the predetermined blinking pattern 50 and the timings of turning on and off the lamps, detected from captured images, is higher than or equal to a predetermined percentage, for example, when the detected timings of turning on and off the lamps match the blinking pattern 50 by 80 percent or higher, the identification unit 34 identifies the vehicle included in the captured images as the vehicle that applies to the vehicle recognition information. The identification unit 34 makes a determination based on the degree of matching. Therefore, it is possible to allow the case where the statuses of the lamps are not detectable, that is, for example, when the capturing interval of the camera 24 overlaps with a shift of blinking of the lamps as shown at time t9.

Referring back to FIG. 2, the identification unit 34 keeps track of the other vehicle having the identified vehicle ID or agent ID with the use of the captured images, and derives a relative location between the host vehicle and the other vehicle. The identification unit 34 may derive the location of the other vehicle based on not only the captured images but also a detected result of an object detection sensor, such as radar and acoustic wave sensor, provided in the host vehicle.

When the identification unit 34 is not able to identify the vehicle that is included in the captured images and that matches the vehicle recognition information, the identification unit 34 determines whether to execute the vehicle identification process again. When a re-execution condition is satisfied, the identification unit 34 determines to re-execute the vehicle identification process. When the re-execution condition is not satisfied, the identification unit 34 ends the vehicle identification process.

A plurality of re-execution conditions may be prepared. The identification unit 34 determines to re-execute the vehicle identification process when any one of the re-execution conditions is satisfied. For example, the re-execution condition is satisfied when the controller of another vehicle has completed identifying the host vehicle, and is not satisfied when the controller of another vehicle has not completed identifying the lost vehicle. The communication unit 30 acquires, from the controller of another vehicle, information indicating that the controller of another vehicle has completed identifying the first vehicle 10. The identification unit 34 determines to re-execute the vehicle identification process based on the acquired information. Alternatively the re-execution condition satisfied when the distance between the host vehicle and another vehicle is shorter than or equal to a predetermined spacing, and is not satisfied when the distance between the host vehicle and another vehicle is longer than the predetermined spacing. The identification unit 34 acquires the location information of another vehicle having an unidentified vehicle ID from the server device that collects the location information of vehicles, and derives the distance between the host vehicle and the other vehicle.

When the identification unit 34 determines to re-execute the vehicle identification process, the identification unit 34 causes the communication unit 30 to transmit a request to the controller of the other vehicle having the unidentified vehicle ID to re-execute the blinking pattern set in the vehicle recognition information. Thus, when the identification unit 34 fails to detect the blinking pattern, the identification unit 34 is able to re-execute the vehicle identification process.

The identification unit 34 re-executes the vehicle identification process not only at the time of starting agent coordination but also during agent coordination. For example, when another vehicle with which the host vehicle is in agent coordination cannot be kept track of by an in-vehicle sensor or after a lapse of a predetermined time from the vehicle identification process, the identification unit 34 re-executes the vehicle identification process.

In the vehicle identification process, the identification unit 34 transmits the blinking pattern of the lamps 25 to another vehicle as the vehicle recognition information, and instructs the lamps 25 to blink in accordance with the transmitted blinking pattern.

In the vehicle identification process, the identification unit 34 receives the predetermined blinking pattern from another vehicle and then identifies the vehicle that blinks the lamps in the blinking pattern; however, the vehicle identification process is not limited to this configuration. For example, the identification unit 34 may determine a predetermined blinking pattern in accordance with which another vehicle is caused to blink, and transmit the predetermined blinking pattern from the host vehicle to the other vehicle. Specifically, the communication unit 30 acquires vehicle IDs from a plurality of other vehicles. The identification unit 34 determines a different blinking pattern for each vehicle ID. The communication unit 30 receives the determined results, and transmits the different blinking pattern for each vehicle ID to the plurality of other vehicles. Thus, when the identification unit 34 detects different blinking of the lamps for each vehicle, the identification unit 34 is able to identify the plurality of other vehicles at the same time.

The agent 36 is a program that implements communication with a driver by recognizing a driver's speech and responding to the speech. The agent 36 not only responds to a driver's speech but also outputs voice prompting a driver's speech or provides driving assistance information to the driver.

The agent 36 acquires a driver's destination from a driver's speech or the navigation system, and estimates the running schedule of the vehicle from the acquired destination and map information. Information about the estimated running schedule is used to coordinate agents with each other. The agent 36 derives a drivers driving attribute from a drivers speech and a past running history. The driver's driving attribute includes information, such as a driver's driving tendency derived from the past running history, and driver's sex and age.

The agent 36 starts coordination with the agent of another vehicle identified by the identification unit 34. For example, as the agent 36 receives a running, schedule that another vehicle passes the host vehicle, the agent 36 provides the driver via the output device 26 with driving assistance information that calls attention to the fact that the other vehicle is scheduled to pass the host vehicle. As the agent 36 receives information indicating the driver's driving attribute of another vehicle, the agent 36 determines whether the host vehicle is able to smoothly pass the other vehicle based on the information indicating the driver's driving attribute of the other vehicle. When the agent 36 determines that the host vehicle is able to smoothly pass the other vehicle, the agent 36 provides the driver of the host vehicle with driving assistance information indicating that the host vehicle is allowed to pass the other vehicle. In this way, by acquiring information related to driving of another vehicle located around the host vehicle through agent coordination, the host vehicle is able to smoothly run in conjunction with the other vehicle.

Figure 4:
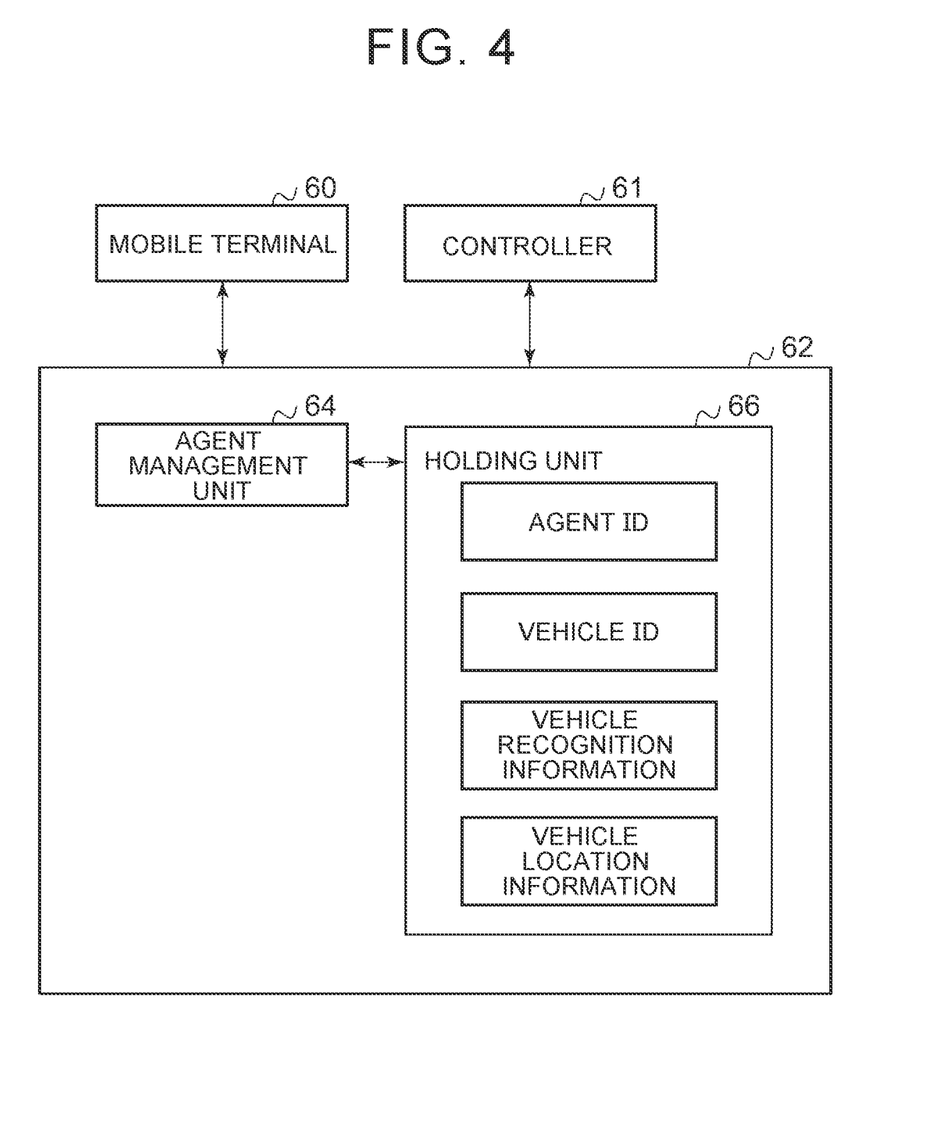
FIG. 4 is a block diagram for illustrating a server device that manages agents.

FIG. 4 is a block diagram for illustrating a server device 62 that manages agents. The server device 62 manages agents by carrying out communication with a plurality of terminal devices on which agent programs are executed. Examples of the terminal devices include a mobile terminal 60 of a driver and a controller 61 mounted on a vehicle that the driver drives. The controller 61 is, for example, the first controller IS or the second controller 38. The server device 62, the mobile terminal 60, and the controller 61 constitute an agent system.

The server device 62 includes an agent management unit 64 and a holding unit 66. The agent management unit 64 manages which terminal device the agent program of the same agent ID is being executed on.

The agent 36 is allowed to be executed on the mobile terminal 60 of a driver, and an agent ID is issued for each driver. The mobile terminal 60 of the drivel has the program of the agent 36. The mobile terminal 60 of the driver executes the program of the agent 36 and responds to a user that is the driver even when the driver is not on the vehicle. The mobile terminal 60 holds the agent ID. When the mobile terminal 60 causes the in-vehicle-side controller 61 to execute the program of the agent 36, the mobile terminal 60 transmits the agent ID to the transmitting and receiving unit 22 of the controller 61, and stops execution of the program of the agent 36 on the mobile terminal 60. For this reason, the agent ID of the agent 36 that is executed on the mobile terminal 60 and the agent ID of the agent 36 that is executed on the controller 61 that has received the agent ID from the mobile terminal 60 are the same. Thus, it is possible to avoid a situation in which the agent 36 is displayed on a plurality of terminal devices at the same time, so the driver easily recognizes the agent.

When the controller 61 executes the program of the agent 36, the controller 61 transmits the vehicle ID to the server device 62 together with the agent ID acquired from the mobile terminal 60. The holding unit 66 of the server device 62 updates association between the agent ID and the vehicle ID. The controller 61 periodically transmits the location information of the host vehicle to the server device 62. The holding unit 66 holds the vehicle location information in association with the agent ID and the vehicle ID. Thus, the agent management unit 64 is able to hold the locations of the agents 36 that are being executed on vehicles, so it is possible to provide information about approaching agents to each agent.

The holding unit 66 may hold pieces of vehicle recognition information in association with vehicle IDs. Thus, the server device 62 is able to provide the agent ID of the agent located around the controller 61 and the corresponding vehicle recognition information. In this way, even when a driver leaves a vehicle and the mobile terminal 60 is executing the agent 36, the server device 62 manages the agent 36. When the agent 36 shifts to the in-vehicle-side controller 61, the server device 62 is able to manage the agent 36 by associating the vehicle ID with the agent ID.

Figure 5:
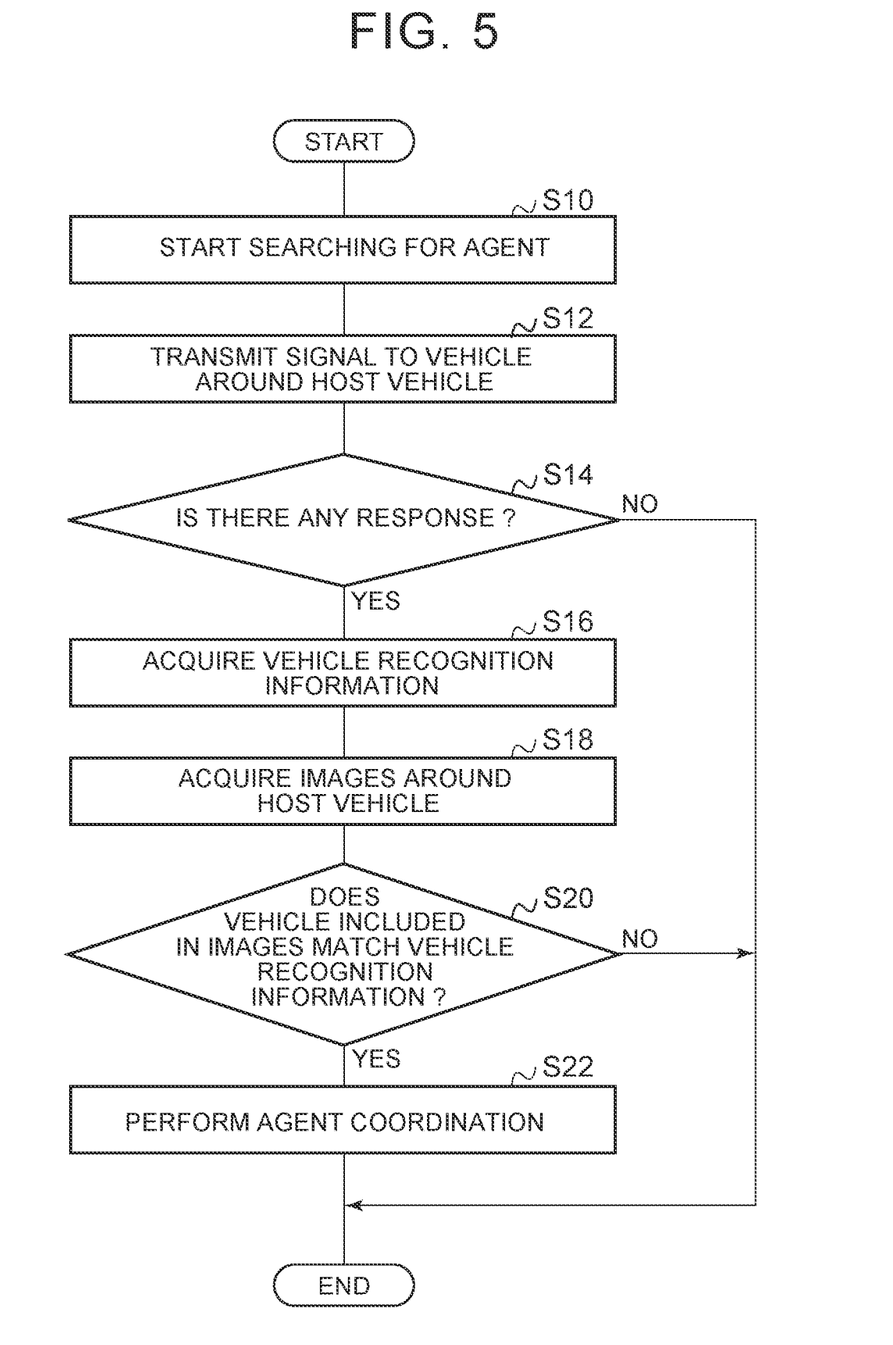
FIG. 5 is a flowchart for illustrating a vehicle identification process.

FIG. 5 is a flowchart for illustrating the vehicle identification process. The agent 36 starts searching for an agent of another vehicle based on a driver's speech and a detected result of the in-vehicle sensor (S10). The agent 36 transmits the vehicle ID and vehicle recognition information of the host vehicle to another vehicle located around the host vehicle (S12).

When no response comes from the agent of another vehicle in response to the transmission (N in S14), the process is ended. On the other hand, as the agent of another vehicle acquires the vehicle ID and vehicle recognition information of the host vehicle, a vehicle ID and vehicle recognition information are transmitted from the other vehicle. The communication unit 30 receives a response from the other vehicle (Y in S14). The identification unit 34 acquires the vehicle recognition information of the other vehicle located around the host vehicle (S16).

The image acquisition unit 32 acquires captured images around the host vehicle (S18). The identification unit 34 determines whether the vehicle included in the captured images matches the vehicle indicated by the vehicle recognition information (S20). When the vehicle included in the captured images does not match the vehicle indicated by the vehicle recognition information (N in S20), the process is ended.

When the vehicle included in the captured images matches the vehicle indicated by the vehicle recognition information (Y in S20), the identification unit 34 identifies the vehicle included in the captured images as the other vehicle indicated by the vehicle recognition information, and the agent 36 coordinates with the agent of the identified other vehicle (S22).

In the embodiment, the communication unit 30 acquires the vehicle ID and vehicle recognition information of the second vehicle 12 by vehicle-to-vehicle communication; however, the disclosure is not limited to this configuration. For example, the communication unit 30 may acquire the vehicle ID and vehicle recognition information of the second vehicle 12 located around the first vehicle 10 from the server device that collects the pieces of location information of vehicles.

The server device holds the vehicle ID of each vehicle in advance, and collects the location information of each vehicle. When a predetermined transmission condition is satisfied, the server device transmits the vehicle ID and vehicle recognition information of the vehicle located around the first vehicle 10 to the first vehicle 10. The predetermined transmission condition, is satisfied, for example, when the first vehicle 10 and the second vehicle 12 approach each other to a predetermined spacing or shorter or when there is a request for agent coordination from the first vehicle 10. For example, when the predetermined transmission condition is satisfied, the server device transmits, to the first vehicle 10, the vehicle ID and vehicle recognition information of the second vehicle 12 and the vehicle recognition information of the first vehicle 10 to be transmitted to the second vehicle 12, and the server device transmits, to the second vehicle 12, the vehicle ID and vehicle recognition information of the first vehicle 10 and the vehicle recognition information of the second vehicle 12 to be transmitted to the first vehicle to.

The embodiment is only illustrative. Various alternative embodiments are possible through combinations of components. Persons skilled in the art understand that the scope of the disclosure also encompasses such alternative embodiments.

In the embodiment, information that defines the blinking pattern of the lamps is transmitted as the vehicle recognition information; however, the disclosure is not limited to this configuration. Examples of the vehicle recognition information may include vehicle model information that indicates the color and type of a vehicle and sign information on a license number plate. The vehicle recognition information may be a combination of vehicle model information, sign information, and blinking pattern information, in any case, the vehicle recognition information is information that indicates the appearance of a vehicle, which is recognized from captured images.

In the embodiment, the blinking pattern of the lamps for identifying a vehicle is performed irrespective of whether the vehicle is moving; however, the disclosure is not limited to this configuration. For example, the agent 36 may be configured to blink the lamps 25 in accordance with the blinking pattern while the vehicle is stopped, and may be configured not to blink the lamps 25 in accordance with the blinking pattern while the vehicle is moving. Thus, it is possible to accurately detect blinking of the lamps 25 with the use of captured images, so it is possible to reduce a situation in which the driver of e another vehicle erroneously recognizes blinking of the lamps 25.

What is claimed is:

1. An agent controller that controls an agent that provides driving assistance information to a driver who drives a first vehicle, the agent controller comprising:
   a storage unit configured to store vehicle recognition information of a second vehicle located around the first vehicle; and
   a processor configured to acquire an image around the first vehicle, captured by a camera, and identify a vehicle included in the captured image as the second vehicle that matches the vehicle recognition information, the processor being configured to transmit information to the second vehicle or receive information from the second vehicle by coordinating the agent of the first vehicle with an agent of the second vehicle identified by the processor, wherein:
the vehicle recognition information of the second vehicle includes a predetermined blinking pattern having a set blinking action of a lamp of the second vehicle;
the processor is configured to identify a vehicle that blinks a lamp of the vehicle in the predetermined blinking pattern as the second vehicle that matches the vehicle recognition information; and
an on duration during when the lamp of the vehicle blinks, set in the predetermined blinking pattern is shorter than an on duration during when the lamp of the vehicle blinks, set in a blinking pattern of hazard flashers.

2. The agent controller according to claim 1, further comprising a communication unit configured to acquire a vehicle ID from each of a plurality of other vehicles, and transmit, to each of the plurality of other vehicles, a blinking pattern that varies among the vehicle IDs.

3. The agent controller according to claim 1, wherein the vehicle recognition information of the second vehicle includes at least one of vehicle model information indicating a color and type of the second vehicle, and sign information on a license number plate of the second vehicle.

4. The agent controller according to claim 1, further comprising a communication unit configured to acquire an agent ID of the agent of the second vehicle and the vehicle recognition information of the second vehicle from a server device that holds the agent ID of the agent of the second vehicle and the vehicle recognition information in association with a vehicle ID of the second vehicle.

5. The agent controller according to claim 4, wherein the communication unit is configured to, when the agent of the first vehicle is executed, associate a vehicle ID of the first vehicle with an agent ID of the agent of the first vehicle and transmit the vehicle ID and the agent ID of the agent of the first vehicle to the server device.

6. The agent controller according to claim 4, wherein the communication unit is configured to acquire an agent ID of the agent of the first vehicle from a mobile terminal of the driver.

7. The agent controller according to claim 1, wherein:
the processor is configured to receive, from the agent of the second vehicle, at least one of information indicating a running schedule of the second vehicle and information indicating a driving attribute of a driver of the second vehicle;
the processor is configured to prepare driving assistance information based on the at least one of information indicating a running schedule of the second vehicle and information indicating a driving attribute of a driver of the second vehicle; and
the processor is configured to provide the driving assistance information to the driver of the first vehicle.

8. An agent coordination method of identifying a second vehicle and coordinating a first agent installed in a first vehicle with a second agent installed in the second vehicle, the agent coordination method comprising:
storing vehicle recognition information of the second vehicle located around the first vehicle;
acquiring an image around the first vehicle, captured by a camera;
identifying a vehicle included in the image captured by the camera as the second vehicle that matches the vehicle recognition information; and
transmitting information to the second vehicle or receiving information from the second vehicle by coordinating the first agent with the second agent of the second vehicle, wherein
the vehicle recognition information of the second vehicle includes a predetermined blinking pattern having a set blinking action of a lamp of the second vehicle;
the agent coordination method includes identifying a vehicle that blinks a lamp of the vehicle in the predetermined blinking pattern as the second vehicle that matches the vehicle recognition information; and
an on duration during when the lamp of the vehicle blinks, set in the predetermined blinking pattern is shorter than an on duration during when the lamp of the vehicle blinks, set in a blinking pattern of hazard flashers.

9. An agent controller that controls an agent that provides driving assistance information to a driver who drives a first vehicle, the agent controller comprising:
a storage unit configured to store vehicle recognition information of a second vehicle located around the first vehicle;
a processor configured to acquire an image around the first vehicle, captured by a camera, and identify a vehicle included in the captured image as the second vehicle that matches the vehicle recognition information, the processor being configured to transmit information to the second vehicle or receive information from the second vehicle by coordinating the agent of the first vehicle with an agent of the second vehicle identified by the processor; and
a communication unit configured to acquire an agent ID of the agent of the second vehicle and the vehicle recognition information of the second vehicle from a server device that holds the agent ID of the agent of the second vehicle and the vehicle recognition information in association with a vehicle ID of the second vehicle.

10. The agent controller according to claim 9, wherein the communication unit is configured to, when the agent of the first vehicle is executed, associate a vehicle ID of the first vehicle with an agent ID of the agent of the first vehicle and transmit the vehicle ID and the agent ID of the agent of the first vehicle to the server device.

11. The agent controller according to claim 9, wherein the communication unit is configured to acquire an agent ID of the agent of the first vehicle from a mobile terminal of the driver.

* * * * *

UNITED STATES PATENT AND TRADEMARK OFFICE
CERTIFICATE OF CORRECTION

PATENT NO. : 10,659,937 B2
APPLICATION NO. : 16/257945
DATED : May 19, 2020
INVENTOR(S) : Satoshi Kume It is certified that error appears in the above-identified patent and that said Letters Patent is hereby corrected as shown below:

On the Title Page

Item (72), inventor city, delete "Chofu" and insert --Chofu-shi Tokyo--, therefor.

Item (57), Line(s) 8, delete "identity" and insert --identify--, therefor.

In the Specification

In Column 1, Line(s) 54, after "around", delete ",".

In Column 1, Line(s) 64, delete "mage" and insert --image--, therefor.

In Column 1, Line(s) 66, before "agent", insert --an--.

In Column 2, Line(s) 15, delete "die" and insert --the--, therefor.

In Column 2, Line(s) 21, delete "unconfigured" and insert --unit configured--, therefor.

In Column 2, Line(s) 65, before "controller", insert --a--.

In Column 3, Line(s) 20, delete "255" and insert --25b--, therefor.

In Column 3, Line(s) 23, after "25b", insert --,--.

In Column 4, Line(s) 27, delete "thrilled" and insert --formed--, therefor.

In Column 4, Line(s) 57, after "combination", insert --of--.

In Column 5, Line(s) 27, after "pattern", delete ",".

Signed and Sealed this
Fourth Day of August, 2020

Andrei Iancu
*Director of the United States Patent and Trademark Office*

CERTIFICATE OF CORRECTION (continued)
U.S. Pat. No. 10,659,937 B2

In Column 5, Line(s) 28, delete "iris" and insert --it is--, therefor.

In Column 5, Line(s) 51, after "turn-on", delete ",".

In Column 6, Line(s) 37, after "driver", delete "s f" and insert --of--, therefor.

In Column 7, Line(s) 21, delete "lost" and insert --host--, therefor.

In Column 7, Line(s) 27, after "condition", insert --is--.

In Column 8, Line(s) 28, after "running", delete ",".

In Column 8, Line(s) 53, delete "IS" and insert --18--, therefor.

In Column 10, Line(s) 16, after "condition", delete ",".

In Column 10, Line(s) 29, after "vehicle", delete "to." and insert --10.--, therefor.

In Column 10, Line(s) 43, delete "information, in" and insert --information. In--, therefor.

In Column 10, Line(s) 57, delete "of e another" and insert --of another--, therefor.